United States Patent [19]
Gerber et al.

[11] 3,730,634
[45] May 1, 1973

[54] APPARATUS FOR CUTTING AND DRILLING SHEET MATERIAL

[75] Inventors: Heinz Joseph Gerber; David R. Pearl, both of West Hartford, Conn.

[73] Assignee: Gerber Garment Technology, Inc., East Hartford, Conn.

[22] Filed: Nov. 27, 1970

[21] Appl. No.: 92,983

Related U.S. Application Data

[63] Continuation-in-part of Ser. No. 1,412, Jan. 8, 1970.

[52] U.S. Cl. .................408/22, 83/925 CC, 408/3, 408/76, 88
[51] Int. Cl ............................................. B27c 9/00
[58] Field of Search...................408/22, 76, 88, 3; 83/925 CC

[56] References Cited

UNITED STATES PATENTS 3,626,799  12/1971  Gerber et al. ..................83/925 CC

*Primary Examiner*—Francis S. Husar
*Attorney*—McCormick, Paulding & Huber

[57] ABSTRACT

Apparatus for cutting and drilling layups of sheet material and including a table for supporting a layup, a main carriage supported for movement in one coordinate direction relative to the table, and cutting and drilling heads supported on the carriage for movement therewith and relative thereto and to each other in at least one other coordinate direction. The main carriage and the cutting and drilling heads move in response to positioning signals supplied by a numerically controlled or computerized controller. A movable cutting tool or blade driven by the cutting head is adapted to advance in cutting engagement with the layup to form a cut therein. A trepanning or drilling tool carried by the drilling head removes material from the layup at selected points to form openings therethrough. The shape of the drilling tool is such that the drilling operation is performed with a minimum of applied pressure, so that substantially no compressive force is applied to the layup by the drilling tool to cause movement of upper layers of the layup relative to the cutting tool.

17 Claims, 8 Drawing Figures

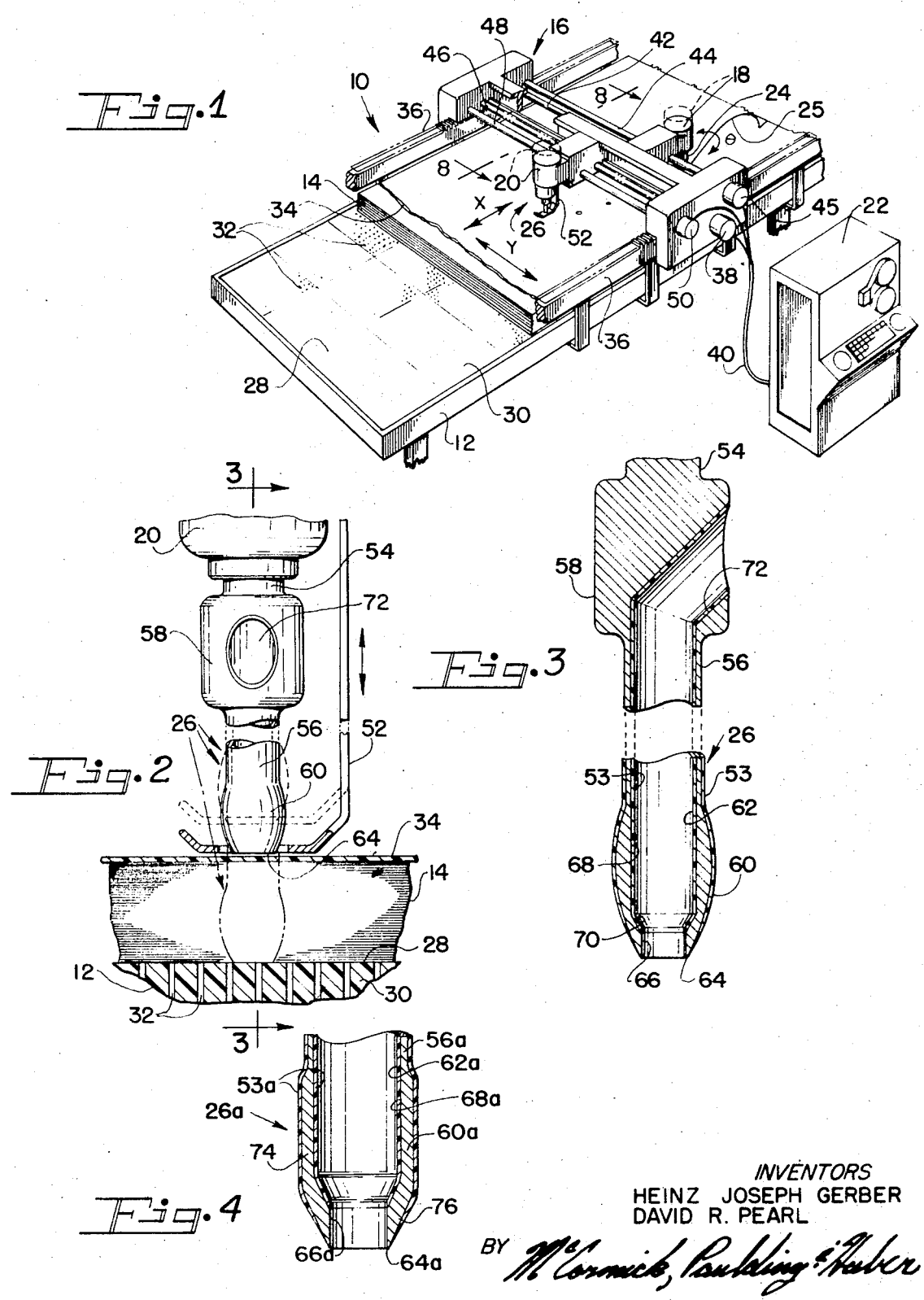

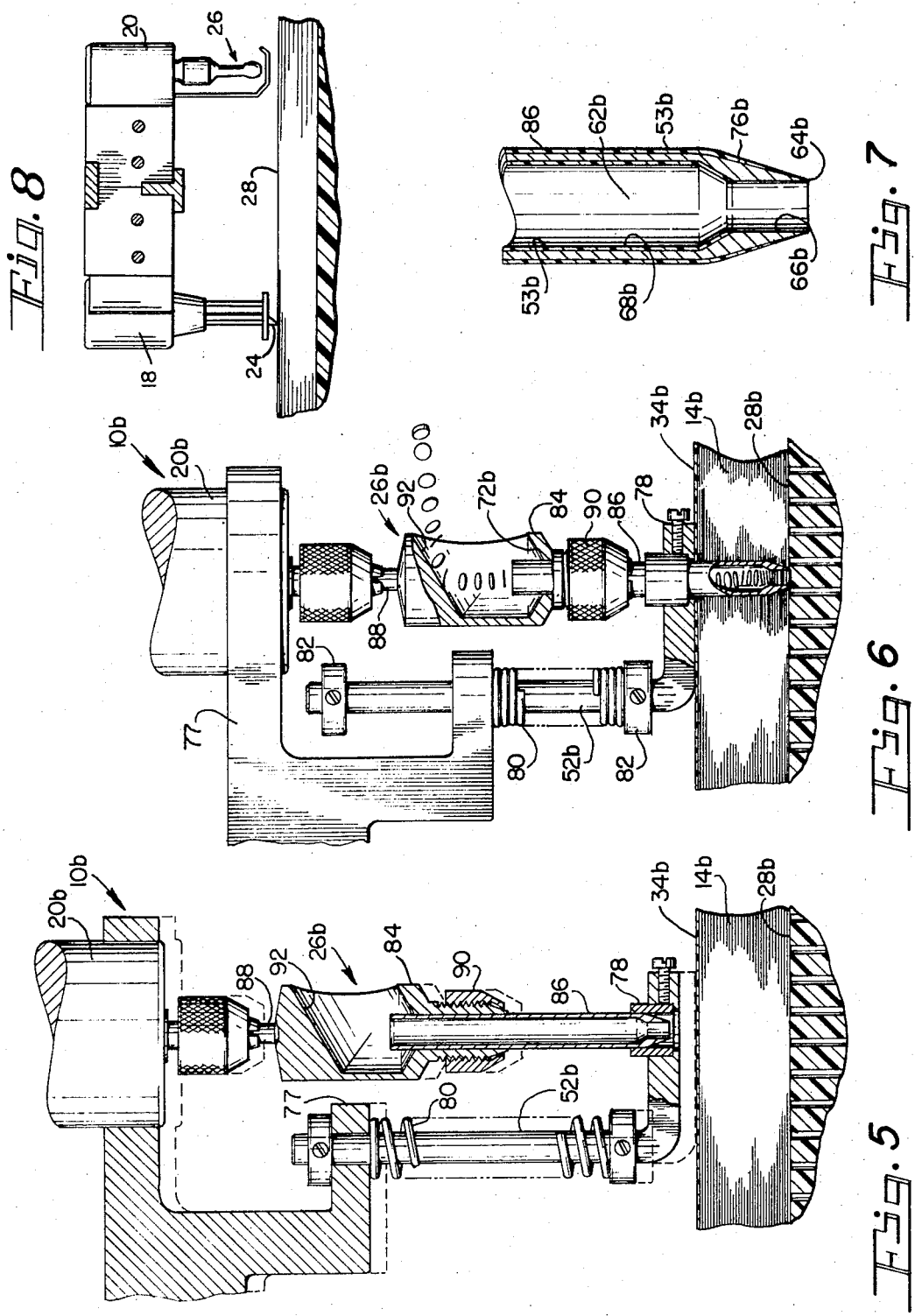

3,730,634

APPARATUS FOR CUTTING AND DRILLING SHEET MATERIAL

CROSS-REFERENCE TO RELATED APPLICATION

This application is a continuation-in-part of pending application Ser. No. 1,412, filed Jan. 8, 1970, and now abandoned, "Apparatus for Cutting and Drilling Sheet Material."

BACKGROUND OF THE INVENTION

This invention relates in general to apparatus for working on sheet material and the like and deals more particularly with an improved apparatus for cutting and drilling layups of sheet material. The apparatus of the present invention is particularly adapted to cut a plurality of component parts from a layup of sheet material and to drill the parts while they are being cut or at least before the cutting operation has been completed. The present apparatus may, for example, be used advantageously in the preparation of upholstery components where one or more holes must be formed in each component to receive a button or like fastener.

In an apparatus for cutting component parts from a layup of sheet material and having a plurality of cutting tools, cutting pressure applied by one of the tools may, and often does, cause some local compression or compaction of the upper layers which comprise the layup. This localized compression is accompanied by some shifting of the material in the outer surrounding region causing movement of the material relative to the other tool or tools so that the resulting components cut from the layup will not be substantially identical in size and shape. The general aim of the present invention is to provide an improved apparatus to overcome this problem.

SUMMARY OF THE INVENTION

In accordance with the present invention, a cutting and drilling apparatus is provided which includes a work piece supporting surface, a main tool carriage supported for movement in one coordinate direction relative to the surface, and cutting and drilling heads supported by the carriage for movement therewith and relative thereto and to each other in at least one other coordinate direction. The cutting head carries a movable cutting tool or blade adapted to advance in cutting engagement with a layup of sheet material along any line, which may be straight or curved, to cut component parts therefrom. The drilling head carries an hollow axially elongated rotatable drilling tool which is movable in an axial direction generally toward and away from the supporting surface and is shaped to perform a trepanning operation on the layup without applying substantial compressive force thereto so that the drilling tool may operate on the layup during the cutting cycle or during an interruption in said cycle without causing upper layers of the layup to shift relative to the cutting tool.

BRIEF DESCRIPTION OF THE DRAWINGS

FIG. 1 is a fragmentary perspective view of a cutting and drilling apparatus embodying the present invention.

FIG. 2 is a somewhat enlarged fragmentary side elevational view of the drilling head of the apparatus of FIG. 1.

FIG. 3 is a somewhat enlarged fragmentary sectional view taken generally along the line 3—3 of FIG. 2.

FIG. 4 is generally similar to FIG. 3 but shows another drilling tool.

FIG. 5 is a somewhat enlarged fragmentary side elevational view of the drilling head portion of another cutting and drilling apparatus embodying the present invention, and shows the drilling head in an elevated position.

FIG. 6 is similar to FIG. 5 but shows the drilling head in a drilling position.

FIG. 7 is a somewhat enlarged fragmentary longitudinal sectional view of the drilling tool of FIGS. 5 and 6.

FIG. 8 is a fragmentary longitudinal sectional view taken generally along the lines 8—8 of FIG. 1 and drawn to a scale enlarged from that of FIG. 1.

DETAILED DESCRIPTION OF THE PREFERRED EMBODIMENT

Apparatus made in accordance with the present invention is particularly adapted for cutting and drilling sheet material which is at least somewhat elastic and which may be of either porous or non-porous character, as for example, a woven fabric or a plastic or like material, however, it is more particularly adapted for cutting and drilling a spread or layup of sheet material indicated at 14 which comprises layers of sheet material arranged in face-to-face or face-up vertically stacked relation. Turning now to the drawing and referring particularly to FIG. 1, an apparatus embodying the present invention and indicated generally at 10 includes a table 12, providing support for a layup 14 and a main carriage 16 bridging the table and supported for movement in one coordinate direction relative thereto. Cutting and drilling heads respectively indicated at 18 and 20 are supported on the main carriage for movement therewith and relative thereto and to each other in response to positioning signals supplied by a numerically controlled or computerized controller 22. The cutting head 18 includes a cutting tool or blade 24 and is capable of moving in cutting engagement with the layup 14 along any line such as indicated at 25 and which may be straight or curved as required in cutting a given part or component therefrom. A hollow axially elongated trepanning or drilling tool 26 depending from and drivingly supported by the drilling head 20 is adapted to form holes through the layup 14 at preselected locations in response to input signals supplied by the controller 22. The tools 24 and 26 are adapted to apply relatively light cutting pressure to the layup so that there is little tendency for the layup to be compressed by the tools; thus, parts cut from the upper layers of the layup will be substantially identical in size and shape to parts cut from the lower layers thereof.

Various forms of table structures may be employed in practicing the present invention, but preferably and as shown, the table 12 comprises a vacuum table which has a generally horizontally disposed material supporting surface 28 defined by a bed of resilient penetrable material 30. A plurality of holes 32, 32 formed in the material 30 open through the surface 28 defined by a bed of resilient penetrable material 30. A plurality of holes 32, 32 formed in the material 30 open through the surface 28 and communicate with a vacuum chamber (not shown) located therebelow. In the illustrated case, the layup 14 comprises a plurality of sheets of porous fabric. An expendable sheet of substantially air-impervious material indicated at 34 is positioned to overlie the exposed surfaces of the layup 14 so that vacuum from the table surface 28 acts through the fabric and on the lower surface of the air-impervious sheet 34 to draw the latter sheet toward the table surface to compress or compact the layup 14. For a more complete disclosure of the preferred vacuum table, reference may be had to U.S. Pat. No. 3,495,492, issued Feb. 17, 1970, for "APPARATUS FOR WORKING ON SHEET MATERIAL."

The carriage 16 is supported for movement relative to the table 12 by a pair of elongated racks 36, 36 at opposite sides of the table and includes a drive shaft (not shown) which extends transversely of the table. Pinions mounted at its opposite ends of the drive shaft engage the racks 36, 36 to move the carriage longitudinally of the table or in a direction indicated by the arrow X, in response to operation of a drive motor 38 drivingly connected to the shaft and electrically connected to the controller 22 by a line 40.

Further considering the cutting head 18, a guide rod 42 and a parallel lead screw 44 extend transversely of the carriage 16 to support and drive the cutting head in a transverse direction as indicated by the arrow Y, in response to operation of another drive motor 45. The latter motor is drivingly connected to the lead screw 44 and electrically connected to the controller 22 to receive output signals therefrom. The blade 24 extends downwardly from the body of the cutting head 18 and is reciprocated vertically by a motor in the cutting head. It may also be rotated about its own axis in a direction indicated by the arrow $\theta$ by another motor in the cutting head. The cutting head 18 is mounted on the carriage 16 for vertical movement relative thereto so as to be capable of being raised to elevate the blade 24 to raise it from its normal cutting position to a position at which it is located entirely out of and above the layup 14. That is, when the cutting head 18 is raised, the lower extremity of the blade 24 is positioned above the layup 14 so that the cutting head and the blade 24 may, if desired, be moved to any preselected position above the layup and then lowered to pierce the layup. Thus, a cut may be started at any desired position on the layup and inwardly of the marginal edges thereof. The blade 24 has a vertically disposed cutting edge and cuts with a relatively short vertically reciprocating stroke so that no appreciable downward force is exerted upon the layup as the blade 24 moves in cutting engagement therewith. For further disclosure of a preferred arrangement of the cutting head and its associated blade, reference may be had to the aforesaid U.S. patent.

Considering now the drilling head 20 in further detail and referring particularly to FIGS. 1–3, the drilling head is supported on the carriage 16 by a guide rod 46 and a parallel lead screw 48 which extend transversely of the carriage. A drive motor 50 mounted on the carriage and electrically connected to the controller 22 by the line 40 rotates the lead screw 48 in one and the opposite direction to move the drilling head 20 in the Y direction. The drilling tool 26 is drivingly supported at its upper end by the drilling head 20 for axial rotation in cutting engagement with the layup 14 and for movement in an axial direction generally toward and away from the table surface 28. In FIG. 2 the tool 26 is shown in an elevated position above the surface of the layup 14, a lowered position of the tool being indicated by broken lines. A presser foot or stripper 52 carried by the cutting head 20 and arranged for vertical movement relative thereto in response to input signals from the controller moves between elevated and lowered positions respectively indicated by broken and full lines in FIG. 2. The stripper has an opening therethrough and through which the drilling tool 26 passes when it is brought into cutting engagement with the layup 14.

The drilling tool 26 is characterized by its relatively thin-walled tubular configuration. Preferably, and as shown, it is made from metal and at least the portions of the tool which engage the material to be drilled are coated with plastic or other suitable material to reduce friction. The nature of the coating material employed will, of course, be determined by the material to be drilled, however, Teflon has been found particularly well suited as a coating material for general drilling operations. More specifically, the drill 26 has a generally cylindrical axially elongated body at least partially coated with plastic material 53 and includes an upper end portion 54 adapted for driving connection with the drilling head 20. The tool 26 further includes a thin-walled tubular shank portion 56 connected to the upper end portion 54 by a diametrically enlarged intermediate portion 58. The lower or free end portion of the shank 56 indicated at 60 is diametrically enlarged and, as shown in FIGS. 2 and 3, has a generally bulbous configuration. A coaxial bore 62 extends through the entire length of the shank 56 and for some distance into the intermediate portion 58, opens through the lower or free end of the tool, and terminates at a sharp radially disposed generally circular cutting edge 64. The bore 62 has a generally cylindrical portion 66 of relatively short axial extent immediately adjacent the cutting edge 64 to permit the tool to be repeatedly sharpened without changing the diameter of its cutting edge. Another cylindrical portion 68 above the portion 66 has a diameter at least equal to and preferably substantially greater than the diameter of the circular cutting edge 64. A generally conical bore portion 70 diverges from the cylindrical portion 68 to the portion 66 to provide transition therebetween. A generally cylindrical passageway 72 formed in the intermediate portion 58 has a diameter substantially equal to the diameter of the portion 68, communicates with the bore 62, and opens radially outwardly through the side wall of the tool. The passageway 72 extends transversely of the axis of the tool 26, is inclined relative thereto and defines a deflecting surface against which scrap material cut from the layup impinges.

In operation, the drilling tool 26 is moved in its elevated position to a preselected position above the layup 14 in response to an input signal from the controller 22. The drilling tool 26 may move in a transverse direction to the Y coordinate of its next preselected drilling position while the cutting tool 24 advances in cutting engagement with the layup 14. When the main carriage is at rest, as when the cutting tool 24 is advancing in a transverse direction, the drilling tool 26 and the cutting tool 24 may operate simultaneously. More usually, however, the apparatus is programmed to interrupt the cutting cycle when the drilling tool, which has previously moved to the Y coordinate of its next preselected drilling position, reaches the X coordinate of its drilling position. Upon completion of the drilling cycle, the cutting cycle is resumed.

When the tool 26 reaches its preselected drilling position, the stripper 52 is first lowered into general engagement with the upper surface of the air-impervious sheet 34. Thereafter, the rotating tool 26 is lowered through the stripper and into cutting engagement with the sheet 34 and the layup 14 therebelow. The sharp cutting edge 64 removes a circular disc from the sheet 34 and from each successive layer of sheet material comprising the layup as the tool is lowered or moved towards the surface 28. The tool may slightly penetrate the table material 30 so that the lowermost sheet comprising the layup will be accurately drilled. As the tool 26 moves downwardly through the layup, each disc of material cut therefrom moves upwardly through the bore portion 66 and into the enlarged bore portion 68, impinges on the wall of the passageway 72, and ultimately leaves the rotating tool through the passageway 72. Since all but the lower end-most portion of the bore preferably has a diameter substantially greater than the diameter of the cutting edge 64, the discs pass freely therethrough and offer substantially no resistance to the downwardly movement of the tool which otherwise might tend to compress the layup.

It will be noted that the bulbous end portion 60 tends to gradually slightly enlarge the opening formed in each successive layer of the layup as the drilling tool 26 passes downwardly therethrough, so that frictional engagement between the layup and the tool shank 56 is minimized. The stripper 52 remains in general engagement with the sheet 34 until the tool 26 is withdrawn from the layup and moves to its elevated position. Thereafter, the stripper 52 is moved to its elevated position preparatory to the next drilling cycle.

Turning now to FIG. 4, a modified form of the drilling tool is shown and indicated generally at 26a. The tool 26a is substantially identical in most respects to the tool 26 previously described, but differs therefrom in the configuration of its enlarged free end portion. More specifically, the tool 26a has a hollow cylindrical shank portion 56a and a diametrically enlarged free end portion 60a. It also includes a bore 62a which has a generally cylindrical portion 66a of relatively short axial extent immediately adjacent the free end thereof and partially defining a sharp generally circular cutting edge 64a. An enlarged bore portion 68a is also provided above the bore portion 66a for the free passage of material cut from a layup as previously described. The enlarged free end of the tool has a generally cylindrical portion 74 and includes a conical portion 76 which diverges from the latter cylindrical portion and terminates at the cutting edge 64a.

Referring now to FIGS. 5–7, another apparatus embodying the present invention is indicated generally at 10b. The apparatus 10b is similar in many respects to the apparatus 10 previously described, but differs therefrom in the construction and arrangement of its drilling head. Consequently, only the drilling head portion of the apparatus 10b is shown. Parts of the apparatus which correspond to parts previously described bear the same reference numeral and a letter b suffix.

The apparatus 10b includes a bracket 77 mounted on the main carriage of the apparatus, which is not shown. A drilling head 20b mounted on the bracket 77 and drivingly supporting a trepanning or drilling tool 26b is arranged for movement with the carriage and relative thereto in response to signals received from an associated controller to form holes through a layup of sheet material indicated at 14b and positioned on a supporting surface 28b. As shown, the upper surface of the layup is defined by a sheet of substantially air-impervious material indicated at 34b. A presser foot or stripper 52b supported on the bracket 77 for movement with the drilling head 20b and the drilling tool 26b and for movement relative thereto generally toward and away from the supporting surface 28b is arranged to engage the upper surface of the layup 14b and at least partially surround the drilling tool 26b when the tool is in drilling engagement with the layup. Preferably, and as shown, the presser foot 52b has a replaceable bushing 78 releasably secured thereto. The bushing receives and supports the free end portion of the drilling tool 26b substantially as shown. A compression spring 80 acts between the bracket 77 and an adjustable collar 82, secured to the presser foot below the bracket, to bias the presser foot toward the supporting surface 28b. Another adjustable collar 82 secured to the presser foot above the bracket limits the downward travel of the presser foot. The collars 82, 82 permit adjustment of the biasing force, the position of the presser foot 52b and its movement relative to the drilling tool 26b.

Considering now the drilling tool 26b in further detail, the tool comprises an upper part or drill holder 84 and a lower part or drill 86. The drill holder 84 has a shank 88 at its upper end adapted to be received in and driven by a rotary chuck associated with the drilling head 20b. Another chuck 90 mounted at the lower end of the drill holder 84 and coaxially aligned with the shank 88 serves to releasably retain the drill 86 is assembly with the drill holder. A passageway 72b formed in the drill holder 84 and opening radially outwardly therethrough defines a deflecting surface 92 disposed generally transversely of the axis of the drill 86.

The drill 86 is generally cylindrical and has a generally cylindrical bore 62b which extends coaxially through its entire length and terminates at its lower or free end at a sharp generally radially disposed circular cutting edge 64b. A generally conical portion 76b at the free end of the drill 86 diverges toward and terminates at the cutting edge 64b, as best shown in FIG. 7. The bore 62b has a generally cylindrical portion 66b of relatively short axial extent adjacent its free end and terminating at the circular cutting edge 64b. The bore 62b also includes an enlarged generally cylindrical portion 68b which provides for the free passage of scrap material drilled or cut from the layup as previously described. Preferably, and as shown in FIG. 7, at least the portion of the drill which engages the layup is coated with plastic material, as indicated at 53b, to minimize friction as previously discussed.

At the beginning of each drilling cycle, the presser foot 52b, the drilling head 20b and the drilling tool 26b are positioned above the layup 14b generally as shown in FIG. 5. In response to a drilling signal received from the controller, the drilling head 20b moves downwardly or toward the supporting surface 28b to bring the presser foot 52b into light pressing engagement with the upper surface of the layup 14b. Thereafter, the drilling head 20b and its associated drilling tool 26b continue to move downwardly so that the drill 86 moves through the bushing 78 and into cutting engagement with the layup 14b. Discs of scrap material cut from the layup pass freely upwardly through the bore 62b into the passageway 72b. The scrap material impinges on the deflecting surface 92 and is thrown radially outwardly from the rotating tool 26b substantially as shown in FIG. 6.

We claim:

1. An apparatus for cutting and drilling a layup of sheet material comprising means defining a layup supporting surface, a main carriage supported above said supporting surface, means for moving said main carriage and said supporting surface relative to one another in at least one coordinate direction, a cutting head carried by said main carriage and supported for movement relative thereto and to said surface in at least one other coordinate direction, said cutting head including a cutting tool adapted to move in cutting engagement with a layup supported on said supporting surface, a drilling head carried by said main carriage and supported thereon for movement relative thereto and to said surface and said cutting head in said other coordinate direction, said drilling head including a hollow axially elongated drilling tool drivingly supported at one end by said drilling head for axial rotation and movement in an axial direction generally toward and away from said supporting surface, said drilling tool having a coaxial bore opening through the free end thereof and including a generally radially disposed circular cutting edge at said free end and partially defined by said bore.

2. An apparatus for cutting and drilling a layup of sheet material as set forth in claim 1 wherein said bore has a diametrically enlarged portion having a diameter greater than the diameter of said circular cutting edge.

3. An apparatus for cutting and drilling a layup of sheet material as set forth in claim 2 wherein said bore includes a cylindrical portion of relatively short axial extent at said free end having a diameter substantially equal to and terminating at said circular cutting edge.

4. An apparatus for cutting and drilling sheet material as set forth in claim 3 wherein said free end includes a generally conical portion diverging to and terminating at said circular cutting edge.

5. An apparatus for cutting and drilling a layup of sheet material as set forth in claim 1 wherein the free end portion of said drilling tool is diametrically enlarged.

6. An apparatus for cutting and drilling a layup of sheet material as set forth in claim 5 wherein said free end portion has a generally bulbous configuration.

7. An apparatus for cutting and drilling sheet material as set forth in claim 5 wherein said free end portion includes a cylindrical portion and a generally conical portion diverging from said cylindrical portion and terminating at said circular cutting edge.

8. An apparatus for cutting and drilling sheet material as set forth in claim 1 wherein said drilling tool has a deflecting surface axially spaced from said free end and extending transversely of the axis of said bore.

9. An apparatus for cutting and drilling sheet material as set forth in claim 8 wherein said drilling tool has a passageway formed therein communicating with said bore and opening radially outwardly therethrough in spaced relation to said free end, said passageway defining said deflecting surface.

10. An apparatus for cutting and drilling a layup of sheet material as set forth in claim 1 wherein said drilling tool is made of metal and the surfaces thereof are at least partially coated with plastic material.

11. An apparatus as set forth in claim 10 wherein said plastic material is Teflon.

12. An apparatus for cutting and drilling a layup of sheet material as set forth in claim 1 wherein said drilling tool comprises two parts, one of said parts including said one end and having means associated therewith for releasably retaining the other of said parts in assembly with said one part, said other part defining said circular cutting edge.

13. An apparatus for cutting and drilling a layup of sheet material as set forth in claim 12 wherein said other part is generally cylindrical and has a generally cylindrical bore extending coaxially therethrough, said cylindrical bore including a first portion of relatively short axial extent having a diameter substantially equal to the diameter of said circular cutting edge, said cylindrical bore including a second portion having a diameter greater than the diameter of said first portion.

14. An apparatus for cutting and drilling sheet material as set forth in claim 13 wherein said one part has a passageway formed therein and opening radially outwardly therefrom and said cylindrical bore communicates with said passageway when said other part is in assembly with said one part.

15. An apparatus for cutting and drilling a layup of sheet material as set forth in claim 1 including a presser foot associated with said drilling head and movable with said drilling tool and relative thereto generally toward and away from said supporting surface, said presser foot being adapted to engage the layup of sheet material and at least partially surround said drilling tool when said tool is in drilling engagement with said layup.

16. An apparatus for cutting and drilling a layup of sheet material as set forth in claim 15 including means for biasing said presser foot toward said supporting surface.

17. An apparatus for cutting and drilling a layup of sheet material as set forth in claim 15 including a bushing carried by said presser foot, said bushing receiving and supporting said free end for axial movement relative thereto.

* * * * *